United States Patent
Lamm et al.

[11] Patent Number: 6,028,370
[45] Date of Patent: Feb. 22, 2000

[54] ADJUSTING DEVICE FOR A SUN ROOF OF A MOTOR VEHICLE

[75] Inventors: Hubert Lamm, Kappelrodeck; Klaus Voehringer, Malsch; Klaus Spinner; Guenther Haderer, both of Buehl, all of Germany

[73] Assignee: Robert Bosch GmbH, Stuttgart, Germany

[21] Appl. No.: 08/991,214

[22] Filed: Dec. 16, 1997

[30] Foreign Application Priority Data

Dec. 17, 1996 [DE]  Germany .......................... 296 21 794

[51] Int. Cl.[7] ........................................... G05B 5/00
[52] U.S. Cl. ........................................... 307/10.1; 318/468
[58] Field of Search ..................... 307/9.1, 10.1; 296/216.01, 221–223; 318/466–468, 470

[56] References Cited

U.S. PATENT DOCUMENTS 5,486,759   1/1996   Seiler et al. .............................. 318/466

FOREIGN PATENT DOCUMENTS 42 29 439 A1   3/1994   Germany .

*Primary Examiner*—Richard T. Elms
*Attorney, Agent, or Firm*—Edwin E. Greigg; Ronald E. Greigg

[57] ABSTRACT

The adjusting device for adjusting a position of a sun roof of a vehicle has one incremental position encoder and two absolute position encoders, with whose aid, at each position of the sun roof, an unambiguous association with the actual position of the sun roof is possible, regardless of whether there has been a failure of the adjusting device or a mechanical change in position of the sun roof. The adjusting device of the invention is intended for a sun roof of a motor vehicle.

6 Claims, 1 Drawing Sheet

ADJUSTING DEVICE FOR A SUN ROOF OF A MOTOR VEHICLE

BACKGROUND OF THE INVENTION

The invention is based on an adjusting device for a sun roof of a motor vehicle. An adjusting device is already known (German DE-OS 42 29 439), which has an electric motor for driving a sun roof whose position has to be regulated precisely. The position of the sun roof is detected by an incremental position encoder and a single absolute position encoder. The absolute position encoder is embodied as a microswitch, which can be actuated via a cam wheel. This cam wheel distinguishes among four ranges (positions) of the sun roof, but only two switching edges can be evaluated by approaching them directly. In a sun roof, essentially three positions of the roof are possible: a null position with the roof closed, a terminal position in the raised mode, and a terminal position in the sliding mode. Accurately ascertaining the position of the sun roof is done by evaluating the electrical signals of the one absolute position encoder and by evaluating the electrical signals of an incremental position encoder. Under certain conditions, such as if the power fails or the sun roof is adjusted by hand, the position derived from the encoders no longer agrees with the actual position of the sun roof. Hence it is no longer possible to detect the range of position the sun roof is in unequivocally, and this can cause the sun roof drive system to react incorrectly or even fail. The known adjusting device, with only one absolute position encoder, is therefore not statically stable, because of the multiple interpretations that can be made of the switching signal output by the absolute position encoder. Moreover, in the known device it is indispensable that the adjusting motion of the sun roof be stored in a microcontroller that is provided. Yet a possible power failure means that the system no longer has any information on the current position of the sun roof, and may possibly identify the wrong range, thus leading to incorrect reactions on the part of the system or to an undesired change in position of the sun roof.

OBJECT AND SUMMARY OF THE INVENTION

The adjusting device of the invention has the advantage over the prior art that an unambiguous positional detection and thus locational positioning of the sun roof is possible at any time. It is especially advantageous that a possible power failure or system crash of a microcontroller that is provided has no deleterious consequences. Advantageously, otherwise-necessary special functions of a program running in the microcontroller, which would have to react immediately to the approach of the end ranges of the sun roof, are not needed. Adjusting the sun roof within the limits specified by the encoder system is especially advantageous, and positioning the electrical drive system in the closed (null) position of the sun roof can be done at any time.

The invention will be better understood and further objects and advantages thereof will become more apparent from the ensuing detailed description of preferred embodiments of the invention taken in conjunction with the drawings.

DESCRIPTION OF THE EXEMPLARY EMBODIMENT

Figure 1:
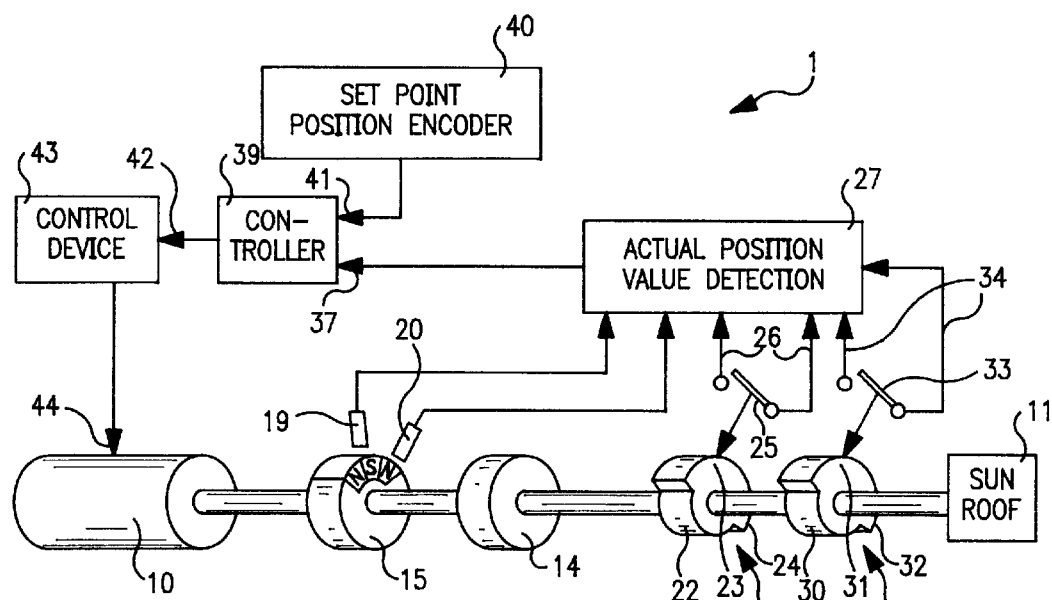
FIG. 1 is a simplified schematic illustration of an adjusting device of the invention.

In FIG. 1, in a schematically simplified mode of illustration, an adjusting device 1 of the invention is shown that has an electric motor 10 for driving a movable part 11, in particular a sun roof of a motor vehicle. The position of the sun roof 11 is detected both by an incremental position encoder 15 and, according to the invention, by two absolute position encoders 16 and 17. The two absolute position encoders 16 and 17 are connected via a gear 14 to the electric motor 10. The incremental position encoder 15 is preferably embodied as a magnetic sensor and by way of example is connected directly to the armature of the electric motor 10. The position encoder 15 for instance comprises a Hall switch and a ring magnet, provided on the armature of the electric motor 10, in order to enable counting the revolutions of the armature of the electric motor 10. An actual position value detection unit 27, embodied for instance as a microcontroller, is provided in order to enable evaluating electrical position signals 19, 20 of the incremental position encoder 15. The position signals 19, 20 of the position encoder 15 do not by themselves, however, suffice to enable ascertaining the absolute position of the sun roof 11. The missing information about the absolute position is received by the actual position signal detection unit 27 from the two absolute position encoders 16 and 17. The first absolute position encoder 16 is embodied as a cam disk 22, for example, which has a first cam 23 and a second cam 24. The cams 23, 24 cooperate with switch means 25, which output an absolute position signal 26 to the actual position signal detection unit 27. In the same way, the second absolute position encoder 17 is also embodied as a cam disk 30, for example, which has a first cam 31 and a second cam 32. The cams 31, 32 cooperate with switch means 33, which output a corresponding absolute position signal 34 to the actual position signal detection unit 27. The two switch means 25, 33 may be embodied in the form of microswitches, for example. Overtaking of one cam edge of the cam disks 22, 30, which corresponds to a specific reference position of the sun roof 11, trips a switching event that is detectable by the actual position signal detection unit 27. During operation, each time a cam edge of the cams 23, 24, 31, 32 is overtaken, a calibration of the incremental position encoder 15 or of the position control can accordingly take place. The absolute position encoders 16, 17 furnish an unambiguous signal only whenever the maximum position adjustment travel of the sun roof 11 corresponds to one revolution, at most, of the cam disks 22, 23. For adaptation purposes, the gear 14 is therefore generally necessary.

An actual position signal 37 output by the microcontroller 27 is compared in a controller 39 with a set-point position signal 41 output by a set-point position encoder 40. The controller 39 outputs a position control signal 42 to a control device 43, which generates an adjusting signal 44 for the electric motor 10. With the aid of both the incremental position encoder 15 and the two absolute position encoders 16, 17, it is possible at any arbitrary position of the sun roof 11 to obtain an unambiguous association with the electrical signals output by the encoders 15, 16, 17, regardless of whether a failure of the adjusting device or a manual change in the position of the sun roof has occurred beforehand. This makes a precise determination of the current position of the sun roof 11 possible at any time.

The adjusting device 1 is an electronic system which assures the opening and closing of the movable part 11 that for example is in the form of a sun roof for a motor vehicle.

Figure 2:
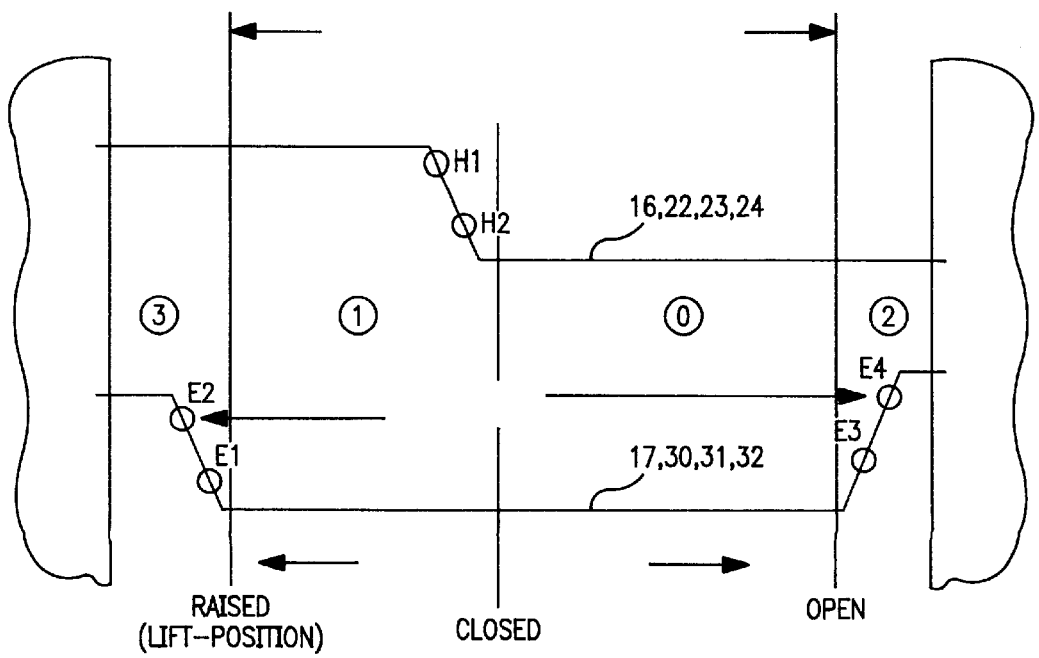
FIG. 2 is a developed view of cam states (the developed view is in the circumferential direction) of cams provided, as a function of the current position of the sun roof.

For actuating the electric motor 10 and triggering it, a logic switch, not shown in detail, and a door closing contact are provided. FIG. 2 is a diagram of cam states of the first cam 22, hereinafter called the raising cam 22, and the second cam 30, hereinafter called the terminal cam 30, as a function of the current state of the sun roof 11; as shown in FIG. 2, the sun roof 11 can assume four states. These are: 0, or "sliding" state; 1, or "raising" state; 2, or "stop-sliding" state; and 3, or "stopraising" state. The three terminal positions of the sun roof 11 are shown in FIG. 2 and marked accordingly: the null position (roof closed), marked "CLOSED" in FIG. 2; the terminal position in the raising mode, marked "RAISED"; the terminal position in the sliding mode, marked "OPEN". If the driver actuates the logic switch of the electric motor 10, the sun roof 11 moves in the associated direction as far as the respective stop position, ascertained by the incremental position encoder 15, unless the logic switch has been released before that. If the sun roof 11 is to be moved out of the sliding mode into the raising mode, for instance, then the logic switch for the raising mode must be actuated long enough that the terminal position in the raising mode is reached. In this process, the electric motor 10 overtakes the null position, "CLOSED", without any intermediate stop. If the logic switch is released before the terminal position is reached, then the electric motor is stopped immediately. If the logic switch for "closing" is actuated, then regardless of the position at the time, the sun roof 11 moves to its null position, unless the logic switch has been released before that.

An automatic mode is also possible. The automatic mode is started, upon opening in the sliding or the raising mode of the sun roof 11, if the logic switch is actuated for a period of 50 ms<t<0.4 s. From that time on, the logic switch, embodied for instance as a toggle switch, can be released, after which the sun roof 11 moves automatically to the intended terminal position. If the logic switch is actuated again after the automatic mode has been started, then the electric motor 10 is stopped immediately. The electric motor 10 stays in repose until the logic switch is released again and reactuated.

In the so-called standardized state, in which the incremental position encoder 15 is calibrated or reset, both manual and automatic operation are possible. The sun roof 11 is closed when the electric motor 10 detects the trailing cam edge of the raising cam 22 from the raising mode to the sliding mode. From the sliding mode, a reversal or in other words resetting occurs in the null position. This assures that the electric motor 10 is always turned off only at a switching edge.

The advantage of the invention is that in conjunction with the incremental position encoder 15, the positions of the end of the raising and sliding modes no longer need to be approached by the switching edges E1 and E2 of the position signal 34 of the second absolute position encoder 17. These switching edges E1 and E2 serve merely to define a range limit that must at all costs not be exceeded. The switching edges E1 and E2 are also used for prestandardizing and optionally for encoding of the system. To close the sun roof 11, from the raising mode, the switching edge H1, H2 of the position signal 26 of the first absolute position encoder 16 is used. From the sliding mode, the closed position is determined by means of the incremental position encoder 15, by using the slowdown value of the electric motor 10 for the positioning. For tolerance reasons, the association of the two cams 22, 30 with one another is very critical. By the use according to the invention of two absolute position encoders 16, 17, which are terminal switches, it is possible to work with an expanded tolerance range. The terminal angles for precise triggering of the electric motor 10 are then determined, in the standardized system, only by the incremental position encoder 15. The closed position of the sun roof 11 is also determined, from the raising mode only, by the switching edges H1, H2. From the sliding mode, the switching edge is no longer approached by reversing in the null position; instead, this is done by the incremental encoder 15 with the inclusion of the most recent slowdown of the electric motor.

The standardization of the incremental encoder 15 is done, upon a restart or failure of the system, in such a way that the logic switch for actuation of the electric motor is actuated long-term and the electric motor 10 in the manual mode detects a switching edge associated with the applicable direction of rotation, of the microswitch system 25, 33. When the electric motor 10 is not standardized, the automatic mode is blocked, and the electric motor 10 is operated at low speed.

In the undefined or in other words destandardized state (after a power failure or reset), the sun roof 11 can be in various states. The following reactions are then possible: First state, "0": Both clockwise and counterclockwise rotation of the electric motor 10 is permitted. In counterclockwise rotation, the system is standardized at the switching edge H1, and the setpoint position "CLOSED" is reversed accordingly. In clockwise rotation, conversely, a stop is effected when the switching edge E4 is reached. In the second state, "1", both clockwise or counterclockwise rotation of the electric motor 10 are permitted. In clockwise rotation, the system can be standardized accordingly at the switching edge H2. In counterclockwise rotation, conversely, a stop is effected when the switching edge E2 is reached. In the third state, clockwise rotation is not permitted, so that in counterclockwise rotation, the system is correspondingly prestandardized at E3. A final standardization is subsequently performed then at the switching position H1. Clockwise rotation after that is not possible until the actual position is in the normal range (first state, "0", and second state, "1"). In the fourth state, "3", no counterclockwise rotation is allowed; that is, the system is suitably prestandardized at the switching edge E3 upon clockwise rotation of the electric motor 10 and is standardized in final form at the switching edge H2. After that, counterclockwise rotation is not possible until the actual position is in the normal range (first state, "0", and second state, "1"). The standardized system can be in only the first state "0" and the first state "1". The adjustment in the normal range, "raising and sliding", is then possible. If while in the standardized state the third state "2" or fourth state "3" is reached, then the electric motor 10 is stopped immediately and the system is destandardized. In FIG. 2, the first state is marked accordingly by "0", the second state by "1", the third state by "2" and the fourth state by "3".

All the positioning actions of the electric motor, including the raising mode and sliding mode terminal positions of the sun roof 11, are effected by means of the incremental position encoder 15. Only the null position is always referred to the trailing switching edge on the null cam (raising cam 22). The position encoder 15 is reinitialized every time there is an edge change in the null position. If the system was previously destandardized, then the switching edges E1 or E3 are used for the prestandardization. The final standardization is then effected at the switching point H1 and H2. The switching point H1 is the reference for the raising angle, and H2 is the reference for the sliding angle. The null position is located at the transition of the raising cam 22 from the raising mode to the sliding mode. To preclude hysteresis at the raising cam 22 from having any influence, an approach of the electric motor 10 is always done from the raising range into the null position.

The foregoing relates to a preferred exemplary embodiment of the invention, it being understood that other variants and embodiments thereof are possible within the spirit and scope of the invention the latter being defined by the appended claims.

We claim:

1. An adjusting device for adjusting a sun roof of a motor vehicle, which comprises an electrical drive mechanism, an incremental position encoder and two absolute position encoders, a detection unit (27) which ascertains a position of the sun roof, driven by the electrical drive mechanism, said two absolute position encoders, include a first position encoder (16) and a second position encoder (17), each said first position encoder and said second position encoder can assume two switching states (E1, E2; E3, E4, respectively) for outputting corresponding electrical signals to the detection unit (27).

2. An adjusting device in accordance with claim 1, in which the position of the sun roof (11) can be determined on a basis of a switching change of the two absolute position encoders (16, 17) as a function of a direction of rotation of the electrical drive mechanism (10).

3. An adjusting device in accordance with claim 1, in which each absolute position encoder (16, 17) has at least two cams (23, 24; 31, 32, respectively), which cooperate accordingly with switch means (25 and 33), respectively.

4. An adjusting device in accordance with claim 3, in which the switch means (25 and 33) are embodied as microswitches.

5. An adjusting device in accordance with claim 1, in which to close the sun roof (11), a switching edge (H1, H2) output by the second absolute position encoder (17) is detected.

6. An adjusting device in accordance with claim 1, in which the detection unit (27) is embodied in the form of a microcontroller.

* * * * *